United States Patent [19]

Schlunt

[11] Patent Number: 4,651,297
[45] Date of Patent: Mar. 17, 1987

[54] TWO-DIMENSIONAL IMAGE CORRELATOR

[75] Inventor: Richard S. Schlunt, Loma Linda, Calif.

[73] Assignee: General Dynamics, Pomona Division, Pomona, Calif.

[21] Appl. No.: 676,026

[22] Filed: Nov. 28, 1984

[51] Int. Cl.$^4$ .......................... G06G 9/00; G06G 7/16; G06G 7/00; G01S 13/58

[52] U.S. Cl. .................................. 364/822; 364/851; 364/861; 342/52; 350/162.13

[58] Field of Search ............... 364/822, 819, 820, 826, 364/827, 837, 851, 861; 343/9 PS; 350/162.13, 162.14

[56] References Cited

U.S. PATENT DOCUMENTS

| | | | |
|---|---|---|---|
| 3,441,724 | 4/1969 | Taylor | 235/181 |
| 3,592,547 | 7/1971 | Noble | 364/822 |
| 3,599,209 | 8/1971 | Goodrich | 343/9 |
| 3,732,565 | 2/1973 | Symaniec et al. | 343/9 |
| 3,790,926 | 2/1974 | Pekau | 340/3 R |
| 3,802,762 | 4/1974 | Kiemle | 350/162 SF |
| 3,903,407 | 9/1975 | Burnham | 364/822 |
| 3,937,942 | 2/1976 | Bromley et al. | 364/822 |
| 4,071,907 | 1/1978 | Casasent | 364/822 |
| 4,216,474 | 8/1980 | Levine | 343/17.2 PC |
| 4,225,938 | 9/1980 | Turpin | 364/822 |
| 4,285,048 | 8/1981 | Casasent et al. | 364/822 |
| 4,286,328 | 8/1981 | Bocker | 364/851 |

OTHER PUBLICATIONS

"Spread Spectrum Time- and Space-Integrating Optical Processor" V. 19, 1980, Applied Optics, pp. 1546-1549.

Primary Examiner—E. A. Goldberg
Assistant Examiner—Mark Reinhart
Attorney, Agent, or Firm—Neil F. Martin; Edward B. Johnson

[57] ABSTRACT

The electro-optical correlator performs pattern-recognition by forming the columnar dot product of an input image with a reference image at video through-put rates. The correlator incorporates an analog-to-digital converter for digitizing the input-image data, a plurality of serially arranged delays having a delay time equivalent to one input-image data line, each delay for receiving in turn the digitized input data and for producing a parallel output signal, and a vertical column of photodiodes for receiving the respective multiple parallel delayed signals and for converting same to an optical output. The optical output is fed through a lens, reference image mask, and lens unit and is focused on a plurality of photodiodes that are connected to a time-delay-and-integrate (TDI) array. The data from the time-delay-and-integrate array are clocked through an analog-to-digital converter which produces the final system output. The time delay and integrate array may be a charge-coupled device (CCD).

9 Claims, 2 Drawing Figures

TWO-DIMENSIONAL IMAGE CORRELATOR

BACKGROUND OF THE INVENTION

1. Field Of The Invention

The present invention relates generally to the field of image correlating and pattern-recognition. More particularly, it relates to two-dimensional image correlation at video through-put rates.

2. Description Of The Prior Art

There are many applications where it is desirable to correlate an input image signal with a reference image. Such applications are becoming increasingly more common with increased automation. Image correlation is also often necessary where, because of space or environmental considerations, a human observer cannot be present. Also, it is often necessary that the correlation be performed in the fastest possible time. In many applications, the unknown incoming image is in the form of a video scanning signal. Therefore, it is desirable to perform the image correlation function at video through-put rates.

It is well known that optical information processing is powerful due to the fact that optical systems are capable of processing information in parallel at very high information rates with relatively few components. For example, a small missile capable of target recognition requires an image correlator that is relatively simple, is compact in size, requires little or no maintenance, is without mechanically moving parts and can perform "real-time" correlation, i.e. as fast as the optical input signal.

Previously, many correlating systems have the disadvantage of being basically one-dimensional in nature in that the input signal is compared sequentially with a reference. Of course, those skilled in the pertinent arts are aware that modern data processing equipment is capable of performing many real-time procedures through simultaneous parallel processing, or, simply extremely high speed. However, such systems are costly, complex, and generally large.

Some present automatic pattern recognition systems use extremely complicated optics, which are expensive, subject to vibration, and require precision placement. Other systems perform Fourier transformation of the data such transformation generally requires rather sophisticated data processing. Some present systems depend upon special coherent light sources, such as lasers. Coherent systems are highly sensitive to vibration and, therefore must be isolated from the environment in most practical applications. As a result, coherent light systems tend to be large in size and weight and are not easily used in environments such as those aboard ships or aircraft.

Incoherent optical correlation systems have been designed in the past. An example is illustrated in U.S. Pat. No. 3,937,942 to Bromley, incorporated herein by reference. The Bromley patent discloses a multi-channel optical correlation system employing a light source to illuminate a mask having a plurality of linearly disposed channels, each of which has recorded information defined by variations in opacity along its linear length. This system, however, provides only multiple one-dimensional correlations.

Additionally, some of the prior art systems using optical techniques utilize moving parts for performing comparisons. Moving parts are undesirably subject to vibration, acceleration forces, synchronization problems, and wear.

Other previous devices are designed to perform very specific functions, such as determining the speed of a vehicle or computing the radar ambiguity function.

Therefore, it is desirable to have a device that correlates an input image with a reference image at video through-put rates. It is further desirable that such a device be relatively simple and compact in size, be without mechanically moving parts, and not be dependent upon the use of coherent light.

SUMMARY OF THE INVENTION

According to the invention, a two-dimensional image correlator has been devised which electro-optically forms the columnar dot product of an input image with a reference image at video through-put rates. This output may be analyzed easily and quickly to determine the presence and location of a reference image within the input image. Thus, it is a two-dimensional pattern recognition device. In an exemplary embodiment, the input image is in the form of a video scan signal, and the reference image is in the form of a photomask. Typically, the size of the input image is larger than the size of the reference image and the desired function is to recognize the location of the reference image within the input image.

An analog-to-digital converter digitizes the input image data signal to prevent degradation. The digitized data is then clocked into digital storage and delay units. The digital storage and delay units are connected in series and each holds one line of input image data. The number of digital storage and delay units is one less than the number of rows in the reference mask.

Parallel output signals originating from each of the digital storage and display units and after the final unit carry this data to a vertical column of digital-to-light converters. Thus, the data going to the digital-to-light converters represents consecutive pixels from a column of the input image.

The digital-to-light converters receive the respective multiple parallel delayed data signals and convert them into a momentary point of light of representative intensity. This light passes through a cylindrical lens which converts each point of light to a horizontal line of light for passing through a row of the reference image. The light passing through the reference image falls on another cylindrical lens which converts the light passing through each column of the reference image to a photo-sensitive receiver. The photo-sensitive receivers are located in a row. Each receives the light from its respective column of the mask and converts the light intensity to a representative electrical signal. The electrical signals from the receivers are time delayed and integrated and sequentially clocked out synchronously with each clocked input signal. In this manner the output of the time-delay-and-integrate array represents the columnar dot product of the reference image with the input image.

A second analog-to-digital converter may be used to digitize the integrated electrical signal for further analysis and processing.

Other features and many attendant advantages of the invention will become more apparent upon a reading of the following detailed description together with the drawings, wherein like reference numerals refer to like parts throughout.

The drawings disclose by way of example, and not by way of limitation, the principles of the invention and structural implementations of the inventive concept.

DETAILED DESCRIPTION OF THE INVENTION

Figure 1:
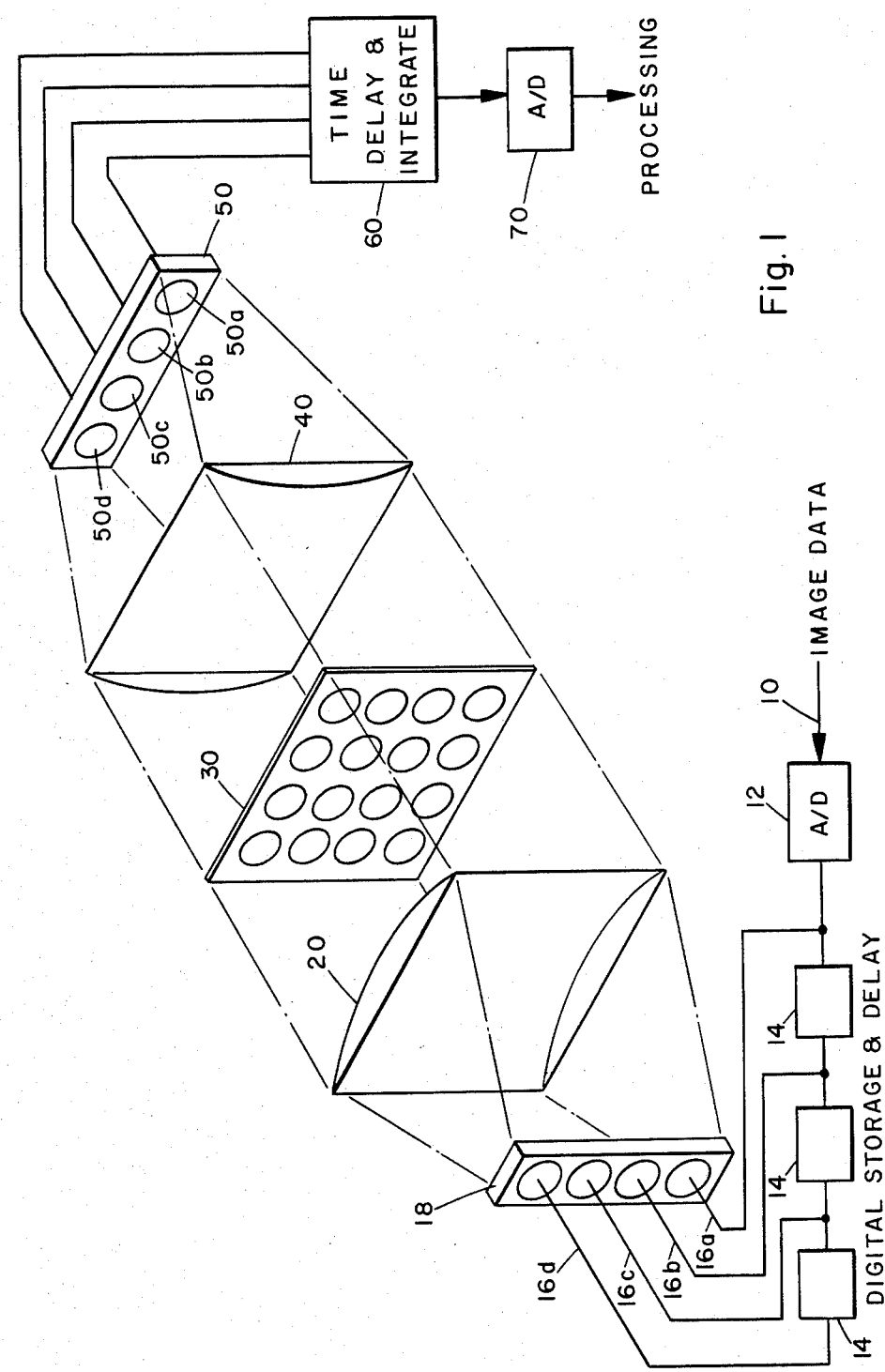
FIG. 1 is a diagramatic view of an exemplary embodiment of the device of the present invention for K=L=4.

With reference now to the drawing, and more particularly to FIG. 1 thereof, there is shown a diagramatic view of the electro-optical, two-dimensional image correlator of the present invention.

In FIG. 1, it is assumed that the image size may be represented by an M×N array having M rows and N columns and that the reference size is K×L where K<N and L<M and that the image is read out serially line-by-line. In the following description the words vertical and horizontal are for purposes of relative position only and should not be taken in the absolute sense. Input signal line 10 carries an incoming image data signal to the device. The incoming image data is in the form of an analog linear scanning signal. An analog-to-digital converter 12 is used to digitize the incoming image data signal to prevent degradation of the data.

The digitized data is then clocked into digital storage and delay units 14. The digital storage and delay units 14, connected in series, each hold one line of data from the image; in this case, N digital values. Since there are K−1 digital storage and delay units, K−1 lines of the image can be held in their storage. K parallel output signal lines 16 a,b,c,d carry digitized image data to a vertical column of digital-to-light converters 18. The first parallel output signal line 16a comes off the input signal line 10 prior to the first of the digital storage and delay units 14. Each of the other parallel output signal lines 16 b,c,d, connects respectively to the input signal line 10 after each of the storage and delay units 14. In this manner, the signals passing to the digital-to-light converters 18 on the parallel output signal lines 16 represent K consecutive image pixel values from a column of the input image.

The digital-to-light converters 18 may be light-emitting diodes (LEDs) used in conjunction with a digital-to-analog converter or a light modulator. The K digital-to-light converters 18 each converts the data signal that it receives from its parallel output signal line 16 a,b,c,d into a light source representative of the data signal intensity.

Light from the digital-to-light converters 18 is passed through a cylindrical lens 20 which diverges each point of light to a horizontal line of light. Each horizontal line of light is then passed through its respective row of the K×L reference mask. Light passing through each column of the mask is then collected by a converging cylindrical lens for converting the light passing through each column of the reference mask 30 to a corresponding point receiver 50 a,b,c,d in a horizontal row of receivers 50. Note that the lenses can be replaced by fiber optics.

If the incoming image is denoted by [I(i,j)] and the reference image is denoted by [R(i,j)], then the light intensity B at the point of focus (p) is shown by $$B_p = \sum_{s=1}^{K} I(i+s-1, j)R(s, p) \text{ for } p = 1, 2 \ldots, L$$

The row of receivers 50 is comprised of K photosensitive receivers, shown here as 50 a,b,c,d, each for receiving the light passing through its respective column of the mask 30 and for converting the integrated light intensity to a representative electrical signal.

A time-delay-and-integrating array (TDI) 60 receives the signals from the row of photo-sensitive receivers 50. A charge-coupled device (CCD) could be used as a combined photo-sensitive receiver 50 and TDI 60.

The intensity of the light signal induces a charge in the TDI array 60 which is directly proportional to the above sum (equation 1) and is summed with the charge already in that position of the array. A second analog-to-digital converter 70 may be used to receive the output of the TDI 60 and digitize the output for further processing and analysis.

Thus, in use, the system of the exemplary embodiment handles data as follows: the incoming image data on the data signal line 10 are digitized and clocked into the digital storage and delay units 14 until the units are filled. As each new data point is then clocked into the system, the digital-to-light converters 18 output that new incoming data signal and the K−1 pixel values in the column above it. With each new set of data being sent through the mask 30, the information in the TDI 60 is shifted over one position, and the TDI position containing the input data passing through the last column of the mask 30 is clocked out of the TDI 60. This sequence is repeated for each data point entering the system. Therefore, as each new line of data is clocked into the system, all possible K×L sub-images contained in the previous K lines of the image are dotted with the reference 30, and the value of the columnar dot product appears as the output of the TDI linear array 60. Thus, as the entire image data is clocked through the system, all possible K×L sub-images in the M×N input image are dotted with the reference 30 and the columnar dot product values appear as the output of the TDI array 60.

Figure 2:
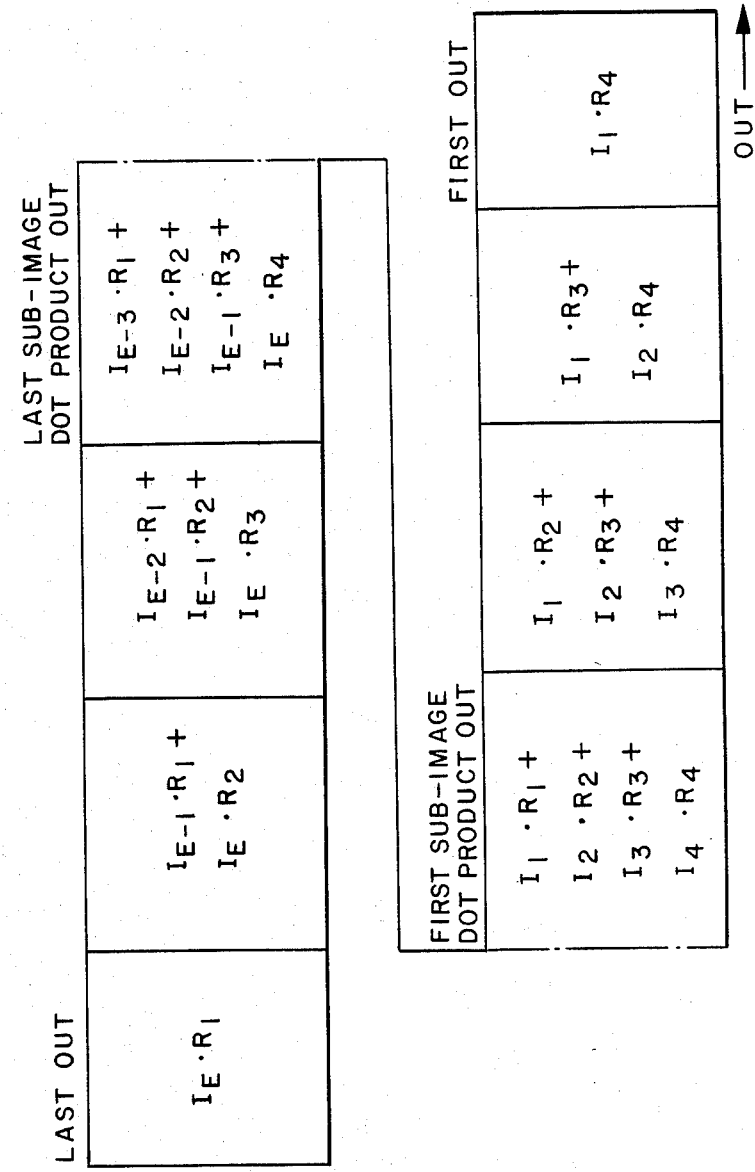
FIG. 2 shows the system output for each strobed input.

With reference now to FIG. 2, there is shown the total columnar dot product output of the TDI 60 with the entire input image. Each square represents one block of output. $I_j$ represents the jth column of input image strobed through the digital to light converters 18. Sub-E represents the last ("end") input image partial column to be strobed. $R_j$ represents the jth column of the reference mask 30. Thus in FIG. 2, the fourth block of data out represents the columnar dot product of a K×L (in this case a 4×4) sub-image of the M×N input image with the K×L reference image.

From the foregoing description, it is seen that the present invention provides an extremely simple, efficient and reliable manner of correlating a reference image with an input image at video through-put rates. The system is adaptive to correlating many different types of images and references. The system is rugged and compact and has no sensitive alignments, nor moving parts.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

Having described my invention, I now claim:

1. A two-dimensional image correlator for correlating a reference image with an input image, comprising:
   a first analog-to-digital converter having an input adapted to receive an analog scanning signal representative of lines of an input image and an output at which a corresponding digital scanning signal representative of lines of said input image is provided;
   a series of digital storage and delay units each having an input and an output, the input of a first one of said units connected to said first analog-to-digital converter output, the output of each one of said units connected to an input of a next one of said units in said series of units wherein each unit receives in sequence as its input said digital scanning signal, stores a portion of said digital scanning signal corresponding to a line of said input image and provides a stored portion of said digital scanning signal at a unit output upon the receiving of a next portion corresponding to a next line of said digital scanning signal;
   a plurality of digital-to-light converters positioned in a columnar orientation, each having an input and an output, the input of one of said digital-to-light converters connected to said first analog-to-digital converter output with the inputs of the other digital-to-light converters each respectively coupled to a different digital storage and delay unit output wherein each digital-to-light converter respectively converts the digital scanning signal received at its input into a point of light that is provided at its output, each point of light being of an intensity corresponding to the received digital scanning signal with the point of light;
   an optically transmissive mask having a reference image recorded thereupon and oriented in rows and columns;
   first optical means for diverging each point of light into a line of light for passing through a different row of said reference image;
   second optical means for converging the line of light passing through each column of said reference image into a corresponding point of light;
   a plurality of photo-sensitive cells positioned in a row orientation each having an input and an output, each cell input receiving at its input a different point of light from said second optical means and providing at its output a corresponding electrical cell signal representative of the intensity of the point of light received from said second optical means; and
   time delay and integrating means for receiving, storing and integrating said cell signal and providing an output signal representative of the columnar dot product of the input image with the reference image.

2. The device of claim 1 further comprising a second analog-to-digital converter having an input connected to said time-delay and integrating means and an output wherein said second analog-to-digital converter receives said output signal, said output signal being the analog type, and an output at which a corresponding digital output signal is provided.

3. The device of claim 1 further comprising means for clocking said digital scanning signal as an output from said first analog-to-digital converter to said one of said digital-to-light converters and for clocking said digital scanning signal through said digital storage and delay units to said digital-to-light converters.

4. The device of claim 1 further comprising means for clocking said output signal as an output from said time delay and integrating means.

5. The device of claim 1 further comprising means for clocking said digital scanning signal as an output from said first analog-to-digital converter to said one of said digital-to-light converters, for clocking said digital scanning signal through said digital storage and delay units to said other digital to light converters, and for clocking said output signal as an output from said time delay and integrating means.

6. The device of claim 1 wherein said first optical means comprises a first cylindrical lens mounted between said digital-to-light converters and said optically transmissive mask, and said second optical means comprises a second cylindrical lens mounted between said optically transmissive mask and said photo-sensitive cells.

7. The device of claim 1 wherein said first optical means comprises a first plurality of optical fibers mounted between said digital-to-light converters and said optically transmissive mask, and said second optical means comprises a second plurality of optical fibers mounted between said optically transmissive mask and said photo-sensitive cells.

8. The device of claim 1 wherein the image correlation is performed at video through-put rates.

9. The device of claim 1 wherein the optically transmissive mask comprises a photo mask.

* * * * *